March 15, 1932.   L. W. THOMPSON   1,849,813
REGULATING SYSTEM
Filed Aug. 1, 1929
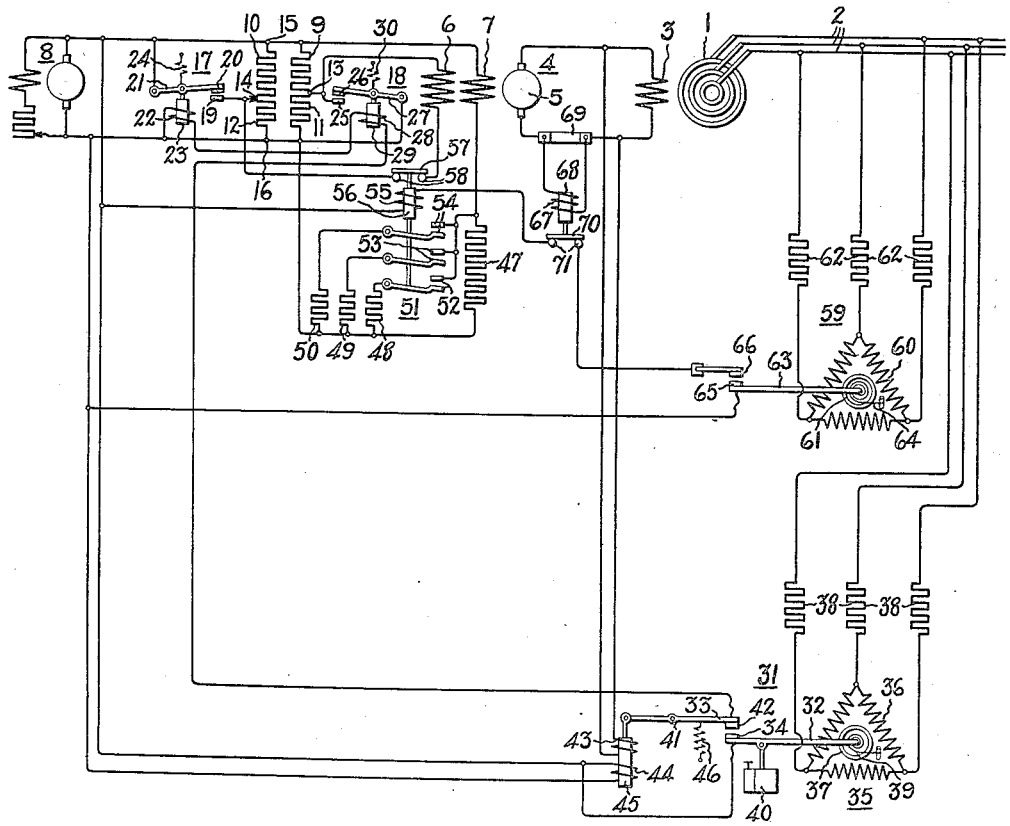
Inventor:
Louis W. Thompson,
by Charles E. Tullar
His Attorney.

Patented Mar. 15, 1932

1,849,813

UNITED STATES PATENT OFFICE

LOUIS W. THOMPSON, OF SCHENECTADY, NEW YORK, ASSIGNOR TO GENERAL ELECTRIC COMPANY, A CORPORATION OF NEW YORK

REGULATING SYSTEM

Application filed August 1, 1929. Serial No. 382,709.

My invention relates to regulating systems and more particularly to regulating systems for the synchronous apparatus of power transmission systems.

The art of electric power transmission has recently entered upon another stage of development involving long lines for transmitting large blocks of power and extensive interconnections of large aggregations of generating capacity. A few years ago, the amount of power transmitted over important lines was relatively small compared with their ultimate transmitting capacity. In such cases, the systems were inherently stable, and there was a reasonable margin of power with respect to load swings and short circuits. Automatic voltage regulators were used primarily for maintaining more uniform voltage conditions than could be obtained by hand control. However with the growth of trunk lines and power networks it has become necessary seriously to consider means for increasing the maximum power and for insuring continuity of service during transient disturbances occasioned, for example, by load swings and short circuits.

It is an object of my invention to provide an improved regulating system for controlling the excitation of a dynamo-electric machine in a system of distribution over a wide range during relatively slow and gradual changes in load and for effecting an accelerated change in the excitation during abnormal transient disturbances in the system occasioned by sudden large changes of load or short circuits.

Another object of my invention is to provide an improved regulating system for dynamo-electric machines utilized in a system of power transmission for increasing the stability limit of the system.

A further object of my invention is to provide an improved regulating system for increasing the output of the synchronous apparatus of a power transmission system when sudden large increments of load or short circuits are imposed upon the system.

The novel features which I believe to be characteristic of my invention are set forth with particularity in the appended claims. The invention itself, however, both as to organization and method of operation, together with further objects and advantages thereof, will best be understood by reference to the following description taken in connection with the accompanying drawing in which the single figure is a diagrammatic representation of a regulating system embodying my invention.

Referring to the drawing which is a diagrammatic representation of a power transmission system wherein my invention has been embodied, 1 indicates a synchronous dynamo-electric machine which is connected to a transmission line or distribution circuit 2. The transformer and switching means ordinarily employed in practice for interconnecting the dynamo-electric machine and the distribution circuit have been omitted in order to simplify the drawing. The synchronous machine 1 is provided with a field winding 3 which is supplied with an exciting current from a source of direct current shown as a dynamo-electric machine or exciter 4. The exciter 4 comprises an armature 5 which is connected to energize field winding 3. In accordance with my invention the exciter 4 is provided with two field windings 6 and 7 respectively, which are preferably connected to be energized from a separate source of electrical energy indicated by a dynamo-electric machine or sub-exciter 8. The normal regulation of the dynamo-electric machine 1 is effected by controlling the energization of field winding 6 but during abnormal transient disturbances in the distribution circuit 2 the circuit of field winding 6 is opened in order to prevent the retardation of the increase of current in field winding 7 due to transformer action between the two windings, and simultaneously therewith a high voltage is imposed upon field winding 7 from the source 8 in order to increase at a high rate the excitation of machine 1 not only to maintain the flux of the synchronous machine but to effect an increase in flux and thereby increase the kilovolt-amperes output.

The control of field winding 6 may be effected by various types of regulators and regulating systems known in the art, such for example as regulators of the Tirrill type, but where the excitation of machine 1 must be varied over a wide range, for synchronous condenser or synchronous motor operation, I find it preferable to use a regulator and system of regulation of the type described and claimed in my application Serial No. 341,159, filed February 19, 1929, and assigned to the same assignee as this application. In accordance with the arrangement shown in my aforementioned application I provide a series of closed resistors 9, 10, 11 and 12 arranged in the form of an electrical bridge of the Wheatstone type. The field winding 6 is connected across alternate junction points 13 and 14, and the sub-exciter 8 is connected across the junction points 15 and 16 which alternate with the points of connection of the field winding 6. Either of the connection points 13 and 14 of the bridge may be made adjustable and for purposes of explanation I have shown the connection at 14 to be adjustable. This adjustable connection of the field winding 6 to the bridge affords an adjustment to permit reversal of the exciter field excitation in order to neutralize the exciter residual voltage and thereby permit the synchronous machine if operating as a synchronous condenser to operate at its maximum lagging conditions.

In order to control the degree of unbalance in the bridge and thereby the magnitude of the current traversing the field winding 6 I provide quick-acting regulating means connected to be controlled in accordance with the value of the electrical characteristic regulated for controlling the effective resistance in opposite arms of the bridge. Any regulating means without appreciable inertia may be used, such for example, as the well known vibrating contact type of relays. An arrangement of this type is illustrated in the drawing and includes vibratory relays 17 and 18 which are arranged to short circuit periodically the resistors 10 and 11, respectively, in opposite arms of the bridge. Relay 17 comprises a stationary contact 19 which is connected to the adjustable contact 14 on one side of resistor 10 and a contact 20 mounted on a pivoted arm 21 which is connected to the other side of the same resistor. The contact 20 and the movable arms 21 are actuated by an electromagnet comprising a solenoid 22 and a plunger 23 which is arranged to move the arm 21. A spring 24 is connected to arm 21 in a manner to oppose the pull of the plunger 23. The relay 18 similarly comprises a contact 25 connected to one side of resistor 11, and a contact 26 mounted on a pivoted arm 27 connected to the other side of resistor 11. The contact 26 and arm 27 are actuated by an electromagnet comprising a solenoid 28 and a plunger 29 which is connected to move the pivoted arm 27. A spring 30 is connected to the arm 27 in a manner to oppose the pull of the plunger 29.

The relays 17 and 18, and thereby the excitation of the exciter 4 may be controlled by any well known type of sensitive regulator, but I find it preferable to use a regulator of the vibratory type and particularly one which responds properly under conditions of unbalance in polyphase systems, such as the type described and claimed in United States Letters Patent No. 1,743,798, granted January 14, 1930, upon an application of Robert H. Park, and assigned to the same assignee as the present application. A regulator of this type is diagrammatically illustrated in the drawing as regulator 31, which in the form shown comprises two contact arms 32 and 33. Contact arm 32 carries a contact 34 and is actuated by a dynamo-electric device 35 which comprises a stationary polyphase primary winding or inducing winding 36 for producing a rotating magnetic field and a rotatable closed circuit secondary or induced winding 37. The winding 36 is connected to be energized from all phases of the circuit 2 through resistors 38. The rotatable member 37 is mechanically connected to actuate contact arm 32 and forms a pivot for this arm. The torque of the rotatable member 37 under predetermined normal conditions in the regulated circuit is counter-balanced by the torque of a spring 39. The winding 36 is arranged on the inner periphery of a stator core member of the type employed for induction motors in the usual manner of a polyphase distributed winding, and the rotor member 37 is preferably constructed of a high resistance material, such as steel, in the form of a hollow shell. The motion of the contact arm 32 is modified by damping means connected thereto and shown as a dashpot 40. The contact arm 33 is pivoted at 41 and carries a contact 42 which is arranged to engage contact 34. Electromagnetic means comprising solenoids 43 and 44 and a plunger 45 which is mechanically connected to said arm is arranged for actuating the contact 42 into and out of engagement with contact 34. The solenoid 43, constituting a part of the so-called anti-hunting means, is connected to be energized in accordance with an electrical characteristic of the synchronous machine field circuit and as shown is connected to be responsive to the voltage of field winding 3. The solenoid 44 which is an additional anti-hunting means is connected to be energized from a substantially constant potential source and as shown is connected across the sub-exciter 8. This arrangement furnishes a stable anti-hunting means and positive action of the contacts even though the field excitation of the synchronous machine is reduced below zero. Resilient means represented by the spring 46 is connected to the contact arm 33 in a manner to oppose the pull of the solenoids 43 and 44. It will be observed that the main regulator contacts, namely 34 and 42, are connected in series with the circuit through the relay solenoids 22 and 28 from the armature of the sub-exciter 8, so that when the contacts 34 and 42 are open the relay coils are deenergized and the contacts 19 and 20, and 25 and 26 are open; and when the main contacts are closed the relay coils are energized and the relay contacts are closed.

In accordance with my invention field winding 7 is provided in order to effect a large and rapid change in the excitation of the main exciter 4 and thereby in the synchronous machine 1 upon the occasion of sudden and heavy load changes or short circuits in the distribution circuit 2. The field winding 7 is connected to be energized from sub-exciter 8 and is arranged to act accumulatively with field winding 6 under normal operating conditions in circuit 2, but the energization thereof is preferably reduced substantially below that of field winding 6 by a suitable resistor 47. In order to effect a rapid change in the energization of field winding 7 when desired, I provide means for substantially and quickly reducing the resistance connected in circuit with field winding 7. In order to handle large field currents without imposing excessive duty on the controlling contacts I find it preferable to provide a plurality of resistors, diagrammatically illustrated by the three resistors 48, 49 and 50, which are arranged to be connected in parallel with resistor 47 when it is desirable to change the current traversing field winding 7. The circuits of the resistors are controlled by a relay 51 having contacts 52, 53, 54 connected in circuit with the resistors 48, 49 and 50, respectively. The contacts of the relay 51 are controlled by an actuating means comprising an operating winding 55 connected to be energized from exciter 8 and a cooperating plunger 56 which is mechanically connected to control simultaneously the engagement and disengagement of the contacts of the relay. The relay 51 is also arranged to effect operation of circuit interrupting means connected in circuit with the field winding 6 simultaneously with the operation of means for increasing the energization of field winding 7 in order to prevent the retardation of current rise in field winding 7 due to any inductive coupling with a closed circuit including field winding 6. A convenient and suitable arrangement for controlling the circuit of field winding 6 is illustrated in the drawing and comprises a switching member 57 connected to be operated by the plunger 56 and arranged to cooperate with contacts 58 connected in series relation with field winding 6. When the contacts of relay 51 are out of engagement the switching member 57 is arranged to bridge contacts 58 and close the circuit through field winding 6 and when the contacts of relay 51 are in engagement the switching member 57 is arranged to open the circuit through field winding 6. For purposes of simplifying the drawing I have shown only one switching point in the circuit to field winding 6 but in actual practice it is preferable to introduce several similar breaks between the terminals of the field circuit, similar to the usual practice in rotary converters, at starting in order to avoid puncture of the field winding insulation due to the high voltage that may exist across points in the field winding 6 during a rapid change in the energization of field winding 7.

The energization of the operating winding 55 of relay 51 is arranged to be controlled in accordance with abnormal transient conditions in the distribution circuit 2 by an electroresponsive device 59. The device 59 is preferably a voltage responsive device capable of responding to a decrease in voltage below a predetermined amount in any one or all phases of the distribution circuit 2. As shown the device 59 is constructed similarly to the alternating current element of the regulator 31 and comprises a stationary polyphase winding 60 for producing a rotating magnetic field and a rotatable closed circuit secondary member 61. The winding 60 is connected to be energized from all phases of the circuit 2 through suitable resistors 62. The rotatable member 61 is mechanically connected to actuate a contact arm and forms a pivot for this arm. The torque of the rotatable member 61 when the voltage in circuit 2 is above a predetermined value is counterbalanced by the torque of a spring 64. The contact arm 63 carries a contact 65 which cooperates with a stationary contact 66 when in engagement therewith to complete a circuit through the operating winding 55 of relay 51 from the sub-exciter 8.

In order to protect field winding 3 from prohibitive heating during any transient disturbance necessitating the rapid and substantial increase of current in the field winding 7 I find it desirable to provide means to limit the current traversing the field winding 3 to a predetermined ceiling value. One protective arrangement which I have found to be satisfactory comprises electromagnetic switching means having an operating winding 67 and a plunger 68. The operating winding 67 is connected to be energized in accordance with the current traversing field winding 3 and as shown is connected to a current shunt 69 connected in series with field winding 3. The plunger 68 controls the operation of a contact member 70 which cooperates with contacts 71 connected in series with the circuit through the operating winding 55 of relay 51.

The operation of the arrangement shown in the drawing is substantially as follows:

First assume that the synchronous machine 1 is in operation and that the exciters 4 and 8 are likewise in operation. Also assume for the instant that contact 34 of regulator 31 is in a fixed position. If the combined pull due to the voltage of exciters 4 and 8 is insufficient to overcome the pull of spring 46 contact 42 will engage contact 34 and close the circuit from exciter 8 through the relays 17 and 18. Resistors 10 and 11 are thereby short-circuited and current traverses the field winding 6 in a given direction. If the pull due to the solenoids 43 and 44 is sufficient to overcome the opposing pull of the spring 46 the contacts 34 and 42 will be disengaged. This closing and opening of the contacts 34 and 42 results in a vibrating action of the relay contacts 19 and 20, and 25 and 26. Now if the bridge were adjusted in regard to resistance values in the different arms so that the ratio of time-opened to time-closed of the contacts of relays 17 and 18 effected a balance in the bridge the points 13 and 14 would be at the same potential and no current would pass through field winding 6. If the ratio of time-opened to time-closed of the contacts is changed the effective resistance in the arms of the bridge may be changed so that the point 13 is of a higher potential than point 14 and current will flow through field winding 6 from the point 13 to the point 14. On the other hand, the point 14 may be shifted from the initial position assumed and with a given ratio of time-opened to time-closed of the relay contacts, the potential of the point 14 may be made higher than the point 13 so that current flows in the reverse direction from that previously assumed.

For a fixed position of contact 34 the voltage of exciter 4 will vary between two values and a certain average value will be maintained. If the voltage of the circuit 2 is at the predetermined value which is to be maintained constant, the torque of the rotor 37 is arranged to balance the opposing torque of the spring 39 and contact 34 will stay in the assumed position. If the voltage of circuit 2 increases, the torque of the rotor 37 will exceed the counter-balancing torque of the spring 39 and the contact 34 will be moved away from contact 42. This decreases the period during which the resistors 10 and 11 are short-circuited and will decrease the excitation voltage applied to field winding 3. If the voltage of the circuit 2 decreases within predetermined limits the torque of the rotor 37 will be less than the counter-balancing torque of the spring 39 and the contact 34 will be moved closer to contact 42 and increase the period during which the resistors 10 and 11 are short-circuited. This results in an increase in voltage applied to field winding 3 and consequently an increase in the voltage of circuit 2.

If the voltage of circuit 2 decreases in any one phase or uniformly in all phases beyond a predetermined amount due to transient disturbances in the system occasioned by sudden and large increments of load or short circuits, relay 59 is arranged to close its contacts 65 and 66. This completes the energizing circuit for the operating winding 55 of relay 51 from sub-exciter 8. Upon energization of winding 55 the plunger 56 operates to close contacts 52, 53 and 54 to connect resistors 48, 49 and 50 in parallel with resistor 47, and simultaneously therewith the plunger 56 operates to open contacts 57 and 58 and interrupts the circuit through field winding 6 in order to avoid retarding the growth of current in field winding 7. The insertion of resistors 48, 49 and 50 in parallel with resistor 47 reduces substantially the resistance in series with field winding 7 and applies substantially the full voltage of sub-exciter 8 across the field 7.

The voltage applied to field winding 7, when the resistance in circuit therewith is substantially reduced, is arranged to be of such a magnitude as to produce a rate of change of volts per second in the voltage applied to field winding 3 to effect an increase in excitation in a fraction of a second not only to maintain constant the flux of the synchronous machine but to increase the flux so that a large increase in kilovolt-amperes output of the machine may be obtained during the period of the disturbance. For example, with a normally rated 30,000 kv. a. synchronous condenser it has been found possible to effect a 55,000 kv. a. change in the condenser output in about 24 cycles on a 60 cycle system.

If during the transient disturbance the current transversing the field winding 3 attains a predetermined maximum value, and before the voltage of circuit 2 has increased to the value corresponding to that field current, the operating winding 67 is arranged to disengage contacts 70 and 71 and interrupt the circuit through the operating winding 55 of relay 51. This operation disconnects the parallel resistors 48, 49 and 50 in circuit with field winding 7 and the excitation of exciter 4 is substantially reduced. Simultaneously therewith the circuit of field winding 6 is closed and regulator 31 takes over the regulation in the manner previously described unless the voltage of circuit 2 decreases again and causes the device 59 to cause relay 51 to apply again the abnormal excitation to field winding 7 in the manner previously described.

While I have shown and described a particular embodiment of my invention, it will be obvious to those skilled in the art that changes and modifications may be made without departing from my invention, and I, therefore, aim in the appended claims to cover all such changes and modifications as fall within the true spirit and scope of my invention

What I claim as new and desire to secure by Letters Patent of the United States, is:

1. In combination, a dynamo-electric machine, two field windings for controlling the excitation thereof, one of said field windings being normally sufficiently energized and the other insufficiently energized to effect regulation of said machine between predetermined limits of variation in an electrical characteristic thereof, and means for controlling the energization of said one field winding in accordance with variations in said electrical characteristic within said predetermined limits and for abruptly increasing the energization of said other field winding in response to abnormal variations of said characteristic in excess of said predetermined limits.

2. In combination, a dynamo-electric machine, two field windings, therefor connected to be normally energized to act accumulatively, means for controlling the energization of one of said windings during predetermined conditions of operation of said dynamo-electric machine, and means for substantially simultaneously deenergizing said one of said field windings and rapidly increasing the energization of the other of said field windings.

3. In combination, a dynamo-electric machine, two field windings therefor, a source of electrical energy connected to energize said field windings, regulating means for controlling the energization of one of said field windings during normal relatively slow gradual variations in an electrical characteristic of said dynamo-electric machine, and electroresponsive means operative during abnormal transient variations in said electrical characteristic for substantially simultaneously interrupting the circuit through said one of said field windings and abruptly effecting the application of a relatively high voltage to the other of said field windings.

4. In combination, a dynamo-electric machine, two field windings therefor, a source of electrical energy connected to energize said field windings, resistance means associated with one of said field windings, vibratory regulating means for controlling said resistance means to vary the energization of said one of said field windings during normal relatively slow and gradual variations of an electrical characteristic of said machine, normally closed circuit interrupting means connected in series relation with said one of said field windings, a resistance in series relation with the other of said field windings, and electroresponsive means operative during abnormal transient variations in said electrical characteristic for substantially simultaneously opening said circuit interrupting means and abruptly decreasing the resistance in series with said other field winding.

5. In combination, a dynamo-electric machine, two field windings therefor, a plurality of resistance units arranged in the form of a Wheatstone bridge, one of said field windings being adjustably connected to alternate connection points in said bridge, a source of electrical energy connected to energize said bridge, vibratory means for periodically short-circuiting resistance in opposite arms of said bridge, normally closed circuit interrupting means in series relation with said one of said field windings, a resistor connected in circuit with the other of said field windings and said source of electrical energy and arranged normally to maintain the current through said field winding substantially below its maximum rated value, a plurality of resistors arranged in normally open circuits in parallel relation with said resistor, and electroresponsive means for substantially simultaneously opening said circuit interrupting means and closing the circuits of said plurality of resistors.

6. In a system of distribution, a dynamo-electric machine, an excitation circuit therefor, means comprising a plurality of windings for controlling said excitation circuit, regulating means for controlling the energization of one of said windings in accordance with variations in an electrical characteristic of said dynamo-electric machine during a predetermined range of operation, and electroresponsive means operative in accordance with variations in an electrical characteristic of said dynamo-electric machine beyond said predetermined range of operation for abruptly increasing the energization of another of said windings.

7. In combination, a polyphase distribution circuit, a synchronous dynamo-electric machine connected thereto, an exciting winding for said synchronous machine, a direct-current dynamo-electric machine connected to energize said exciting winding, a plurality of field windings for said direct-current dynamo-electric machine, a separate source of electrical energy connected to energize said field windings, resistance units connected in circuit with one of said field windings, vibratory relays for periodically opening and closing a circuit around a portion of said resistance units, regulating means connected to be operative in accordance with the voltage of each phase of said distribution circuit for controlling said relays, normally closed circuit interrupting means in circuit with said one of said field windings, a resistor connected in circuit with another of said field windings, a plurality of normally open circuits including a resistor in each circuit connected in parallel relation with said first-mentioned resistor, and electroresponsive means connected to be operative in accordance with a predetermined change in an electrical characteristic of said distribution circuit for substantially simultaneously opening said normally closed circuit interrupting means and closing the circuits of said parallel resistors.

8. In a system of distribution, a polyphase distribution circuit, a synchronous dynamo-electric machine connected thereto, an exciting winding for said synchronous machine a direct-current dynamo-electric machine connected to energize said exciting winding, two field windings for said direct-current dynamo-electric machine, a separate source of electrical energy connected to energize said field windings, a plurality of resistance units arranged in the form of an electrical bridge, one of said field windings being adjustably connected to alternate junction points in said bridge and said source of electrical energy being connected to the points in said bridge alternating with the connection points of said field winding, vibratory relays for controlling the effective resistance of opposite arms of said bridge, regulating means connected to be responsive to the voltage of each phase of said distribution circuit for controlling said relays, a normally closed circuit interrupting means in circuit with said one of said field windings, a resistor connected in circuit with the other of said field windings, a plurality of normally open circuits including a resistor in each circuit connected in parallel relation with said first-mentioned resistor electroresponsive means connected to be responsive to the voltage of any phase of said distribution circuit below a predetermined value for substantially simultaneously opening said normally closed circuit interrupting means and closing the circuits of said parallel resistors, and electromagnetic means having normally closed contacts in circuit with said electroresponsive means and connected to be responsive to the current traversing the exciting winding of said synchronous machine above a predetermined value for closing the circuit interrupting means in series with said one of said field windings and opening the circuit interrupting means in the circuits in parallel relation with said resistor.

In witness whereof, I have hereunto set my hand this 31st day of July, 1929.

LOUIS W. THOMPSON.